(12) United States Patent
Deleris et al.

(10) Patent No.: US 10,366,331 B2
(45) Date of Patent: Jul. 30, 2019

(54) INTERACTIVE METHOD TO REDUCE THE AMOUNT OF TRADEOFF INFORMATION REQUIRED FROM DECISION MAKERS IN MULTI-ATTRIBUTE DECISION MAKING UNDER UNCERTAINTY

(71) Applicant: International Business Machines Corporation, Armonk, NY (US)

(72) Inventors: Lea A. Deleris, Paris (FR); Radu Marinescu, Dublin (IE); Abdul Razak, Cork (IE); Peter Nicholas Wilson, County Tipperary (IE)

(73) Assignees: International Business Machines Corporation, Armonk, NY (US); University College Cork—National University Of Ireleand, Cork, Cork (IE)

( * ) Notice: Subject to any disclaimer, the term of this patent is extended or adjusted under 35 U.S.C. 154(b) by 169 days.

(21) Appl. No.: 15/008,034

(22) Filed: Jan. 27, 2016

(65) Prior Publication Data
US 2016/0155053 A1 Jun. 2, 2016

Related U.S. Application Data

(63) Continuation of application No. 13/839,211, filed on Mar. 15, 2013, now Pat. No. 9,251,461.

(51) Int. Cl.
*G06N 5/02* (2006.01)
*G06N 5/04* (2006.01)
*G06N 5/00* (2006.01)

(52) U.S. Cl.
CPC .............. *G06N 5/022* (2013.01); *G06N 5/00* (2013.01); *G06N 5/02* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,392,231 B2 | 6/2008 | Basak et al. | |
| 7,542,952 B2 | 6/2009 | Yang et al. | |

(Continued)

OTHER PUBLICATIONS

Sen et al. "Design Decision Making Based upon Multiple Attribute Evaluations a Minimal Preference Information", Malhi. Uomput. Modetling, 1994, vol. 20, No. 3, pp. 107-124.*

(Continued)

*Primary Examiner* — Li Wu Chang
(74) *Attorney, Agent, or Firm* — Scully, Scott, Murphy & Presser, P.C.; Kurt Goudy, Esq.

(57) ABSTRACT

There is provided a method, a system and a computer program product for supporting a decision making process. The system receives a decision model from a decision maker, the decision model used for determining a solution to a decision problem based on attributes and uncertainties of the decision problem. The decision problem includes information about a plurality of outcome vectors that represent all possible outcomes and the uncertainties associated with the decision problem. The system determines whether the received decision model can be solved without receiving any preference information from the decision maker. The system receives partially specified preference information from the decision maker if the received decision model cannot be solved without any preference information. The system solves the decision model with the partially specified preference information. The system recommends, based on the solution, one or more decisions to the decision maker.

15 Claims, 4 Drawing Sheets

(56) References Cited

U.S. PATENT DOCUMENTS

| | | | |
|---|---|---|---|
| 7,590,609 | B2 | 9/2009 | Verlinden et al. |
| 7,606,784 | B2 | 10/2009 | Mathias et al. |
| 7,689,524 | B2 | 3/2010 | Ozzie et al. |
| 8,126,736 | B2 | 2/2012 | Anderson et al. |
| 2003/0167265 | A1 | 9/2003 | Corynen |
| 2004/0138950 | A1 | 7/2004 | Hyman et al. |
| 2006/0247990 | A1 | 11/2006 | Narayanan et al. |
| 2008/0115166 | A1 | 5/2008 | Bhogal et al. |
| 2008/0172214 | A1 | 7/2008 | Col et al. |
| 2011/0173308 | A1 | 7/2011 | Gutekunst |
| 2011/0202361 | A1 | 8/2011 | Firminger et al. |
| 2012/0179501 | A1 | 7/2012 | Beresnevichiene et al. |
| 2012/0253771 | A1 | 10/2012 | Col et al. |
| 2013/0066920 | A1* | 3/2013 | Walaschek ........ G06F 17/30595 707/792 |
| 2013/0218817 | A1* | 8/2013 | Vashist ................. G06N 5/025 706/12 |
| 2014/0123017 | A1 | 5/2014 | Gopinath et al. |

OTHER PUBLICATIONS

Marinescu et al., "Multi-objective Influence Diagrams", UAI, 2012, 10 pages.

Aloysius et al., "User acceptance of multi-criteria decision support systems: The impact of preference elicitation techniques", European Journal of Operational Research 169 (2006) pp. 273-285.

Viappiani et al., "Recommendation Sets and Choice Queries: There Is No Exploration/Exploitation Tradeoff!" Association for the Advancement of Artificial Intelligence, Apr. 2011.

Jimenez et al., "A decision support system for multiattribute utility evaluation based on imprecise assignments," Decision Support Systems, Sep. 2003, pp. 65-79, 36, Elsevier Science B.V.

Podinoviski, "A DSS for multiple criteria decision analysis with imprecisely specified trade-offs," European Journal of Operational Research, Mar. 1999, pp. 261-270, 113, Elsevier Science B.V.

Jacquet-Lagreze, "Interactive assessment of preferences using holistic judgments the prefcalc system," 1979, Versailles.

Siskos et al., "Using artificial intelligence and visual techniques into preference disaggregation analysis: The MIIDAS system," European Journal of Operational Research, Mar. 1999, pp. 281-299, 113, Elsevier Science B.V.

Siskos et al., "Minora: A Multicriteria Decision Aiding System for Discrete Alternative," Journal of Information Science and Technology, Jan. 1993, vol. 2, No. 2, Tata McGraw-Hill.

Chajewska et al., "Making Rational Decisions using Adaptive Utility Elicitation," Proceedings of the Seventeenth National Conference on Artificial Intelligence (AAAI-00), Aug. 2000, pp. 363-369, American Association for Artificial Intelligence.

http://web.archive.org/web/20120419170047/http://www.visadecisions.com, Apr. 19, 2012.

http://web.archive.org/web/20120423195231/http://www.isy.vcu.edu/~hweistro/mcdmchapter.htm, Apr. 23, 2012.

http://kt.ijs.si/MarkoBohanec/dexi.html, "DEXi: A Program for Multi-Attribute Decision Making," last updated Nov. 26, 2012.

Wilson, N., et al. "An Axiomatic Framework for Influence Diagram Computation with Partially Ordered Utilities", Association for the Advancement of Artificial Intelligence, 2012.

* cited by examiner

0. Let L be the set of all utility vectors in the utility nodes of the problem ← 200
    - (without loss of generality we assume one utility node) ; let also Cone = {} ← 205
210 → 1. For all pairs (u, v) such that vectors u, v are in L
    - Let score(u, v) = size of the MEU set subject to u > v ← 215
    - Let score(v, u) = size of the MEU set subject to v > u ← 220
    - CandidatePairs = CandidatePairs U {(u,v) ; (v, u)} sorted in ascending order ← 225
        • (so, top of CandidatePairs gives the smallest MEU set) ← 230
235 → 2. For each pair (u, v) in CandidatePairs
    - If User is OK with u > v then add (u, v) to Cone; ← 240
        • Solve the model with the current Cone ← 245
        • If User is OK with current output then Stop; Else continue to Step 255 ← 250
255 → 3. If User is not OK with current output then
    - Generate vectors u and v on the boundary of the Cone ← 260
    - If User is OK with u > v (or v > u) then add (u, v) (or (v, u)) to Cone; ← 265
270 → • Solve the model with the current Cone;
        • If User is OK with current output then Stop; Else continue from Step 255 ← 275

FIG. 2

```
Algorithm 1: ELIM-MOID
Data: A MOID (X, D, P, U) with p > 1 objectives, a legal
      elimination ordering of the variables τ = (Y₁, ... , Yₜ)
Result: An optimal policy Δ
// partition the functions into buckets
1  for l = t downto l do
2  |   place in buckets[l] all remaining components in P and U
   |   that contain variable Yₗ in their scope
// top-down step
3  for l = t downto l do
4  |   let Φˡ = {φ₁,..., φⱼ} and Ψˡ = {ψ₁,...,ψₖ} be the
   |   probability and utility components in buckets[l]
5  |   if Yₗ is a chance variable then
6  |   |   φˡ ← Σ_{Yₗ} Π_{i=1}^{j} φᵢ
7  |   |   ψˡ ← (φˡ)⁻¹ × Σ'_{Yₗ} ((Π_{i=1}^{j} φᵢ) × (Σ_{j=1}^{k} ψⱼ))
8  |   else if Yₗ is a decision variable then
9  |   |   φˡ ← max_{Yₗ} Π_{i=1}^{j} φᵢ
10 |   |   ψˡ ← max_{Yₗ} ((Π_{i=1}^{j} φᵢ) × (Σ_{j=1}^{k} ψⱼ))
11 |   place each φˡ and ψˡ in the bucket of the highest-index
   |   variable in its scope
// bottom-up step
12 for l = 1 to t do
13 |   if Yₗ is a decision variable then
14 |   |   δₗ ← argmax_{Yₗ} ((Π_{i=1}^{j} φᵢ) × (Σ_{j=1}^{k} ψⱼ))
15 |   |   Δ ← Δ ∪ δₗ
16 return Δ
```

FIG. 4

INTERACTIVE METHOD TO REDUCE THE AMOUNT OF TRADEOFF INFORMATION REQUIRED FROM DECISION MAKERS IN MULTI-ATTRIBUTE DECISION MAKING UNDER UNCERTAINTY

CROSS-REFERENCE TO RELATED APPLICATIONS

This application is a continuation of U.S. patent application Ser. No. 13/839,211, filed Mar. 15, 2013 the entire content and disclosure of which is incorporated herein by reference.

BACKGROUND

This disclosure relates generally to decision making, and particularly to eliciting a minimal number of questions to a decision maker in order to solve a decision problem.

An influence diagram is a directed and acyclic graph for use in decision making under uncertainty. The influence diagram includes chance or random variables which specify the uncertain decision environment, decision variables which specify possible decisions to be made in a corresponding decision problem, and a utility function which represents preferences of a decision maker. Each chance variable is associated with a parent set (possibly empty) in a graph which together with that chance variable define a conditional probability distribution. A product of conditional probability distributions defines a joint probability distribution over all possible outcomes in the decision problem. Each decision variable has a parent set (possibly empty) including one or more variables whose values will be known at the time of making of corresponding decisions and may affect directly the decisions. The decision variables are typically assumed to be temporally ordered. A strategy or policy for an influence diagram is a list of decision rules including one rule for each decision variable specifying which decision to make for each value instantiation of the variables in its parent set. Solving an influence diagram is to find an optimal policy that maximizes an expected utility, i.e., achieves a goal of the decision maker.

A probabilistic decision tree (PDT) refers to a model of a decision problem that represents all choices, outcomes and paths that a decision maker may have. A main objective of building and solving a PDT is to find choices that satisfy the decision maker's situation and preference.

As an example, currently, in a health care domain, a patient considers attributes of treatment options before deciding which treatment option to undertake. Attributes include, but are not limited to: pain, disability, side effects, resulting state after a treatment, cost of a treatment, life expectancy. In this multi-attribute decision making, the patient is required to fully elicit his/her preference among all the attributes. The full elicitation from the patient can be time-consuming and cognitively difficult.

SUMMARY

There is provided a method, a system and a computer program product for supporting a decision making process. The system receives a decision model from a decision maker. The decision model is used for determining a solution to a decision problem based on attributes and uncertainties of the decision problem. The decision problem includes information about a plurality of outcome vectors that represents all possible outcomes and the uncertainties associated with the decision problem. The decision model does not include any preference information of the attributes and the outcome vectors. The system determines whether the received decision model can be solved without receiving any preference information from the decision maker. The system receives partially specified preference information from the decision maker if the received decision model cannot be solved without any preference information. The system solves the decision model with the partially specified preference information. The system recommends, based on the solution, one or more decisions to the decision maker.

In order to receive the partially specified preference information from the decision maker, the system identifies N pairs of outcome vectors to present to the decision maker for preference assessment. The system presents N elicitation questions, based on the identified N pairs of outcome vectors, to the decision maker. An elicitation question asks the decision maker which outcome vector the decision maker prefers between two outcome vectors. The decision maker provides answers to the N elicitation questions. The decision maker's answers to the N elicitation questions represent the partially specified preference information.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 illustrates method steps of an algorithm 3 that identifies which pair of trade-off information to elicit.

FIG. 4 illustrates an exemplary pseudo-code for Algorithm 1.

DETAILED DESCRIPTION

This disclosure describes a system, method, and computer program product for minimizing trade-off information (i.e., preference information) to be elicited from decision makers in multi-attribute decision problems with uncertainty. An example of a multi-attribute decision problem includes, but is not limited to: deciding a treatment option in a healthcare industry, where a patient needs to decide (with a help of a healthcare practitioner) which treatment option (s)he prefers while considering several attributes: pain, disability, side effects, a resulting state after applying a treatment option, death, cost, etc. In one embodiment, full elicitation of preferences over all the attributes is avoided. Full elicitation of preference over all the attributes refers to associating a cardinal value to each possible outcome vector that appears in a decision problem.

A decision problem includes information about a plurality of outcome vectors that represent all possible outcomes of the decision problem and further includes information about uncertainties associated with the decision problem. An outcome vector lists all the possible outcomes of a decision problem, e.g., pain, disability, side effects, a resulting state after applying a treatment option, death, cost, etc. Uncertainties are represented by random variables described by states and probability distributions on those states. In one embodiment, a partial elicitation of preference information is used, e.g., by partially specifying of preference over some or all the attributes and/or minimizing of elicitation of preference information from the decision maker. In one embodiment, minimized preference information elicited from a decision maker can also reduce difficulty of questions (e.g., by using outcome vectors and comparison queries). Difficulty of a question represents one or more of: user-friendliness of the question, how difficult to answer to the question, how accurately the decision maker can provide an answer to the question, etc. A comparison query refers to a query for determining a preference between two attributes.

Figure 1:
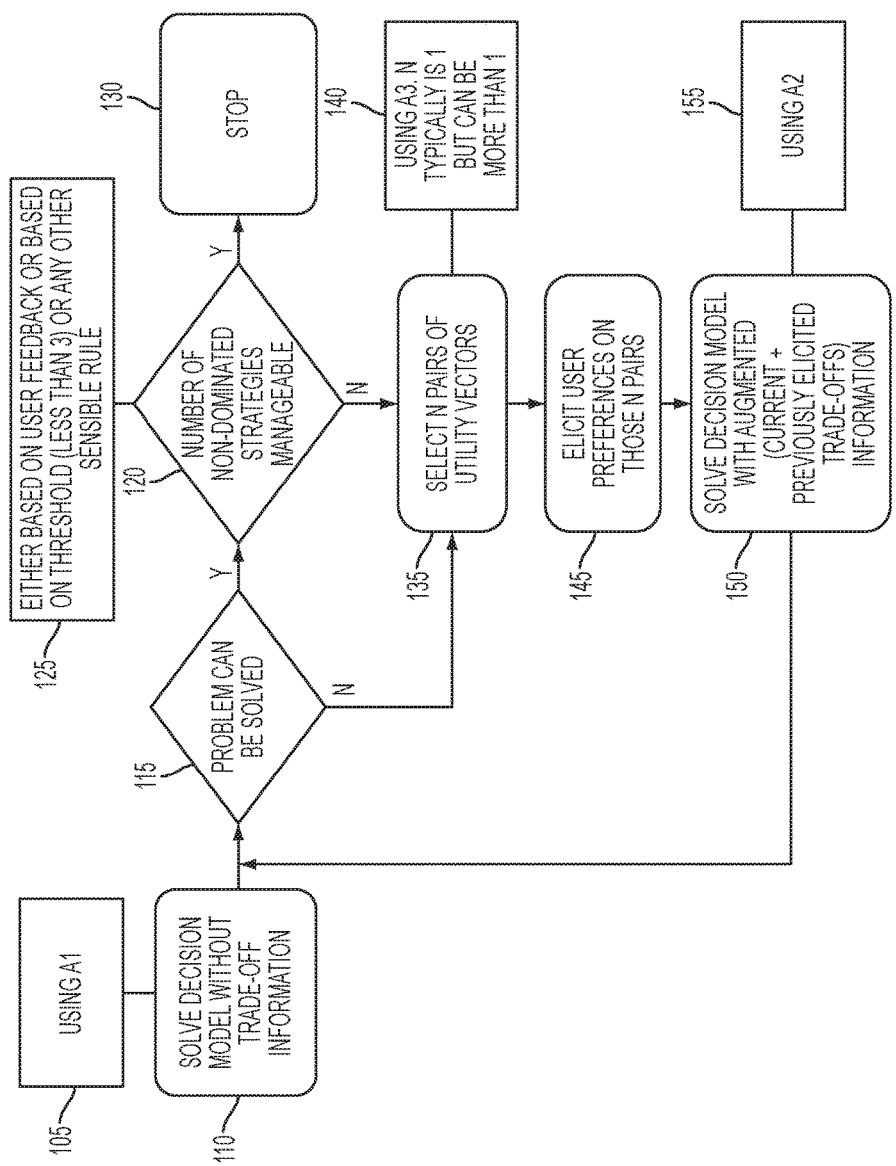
FIG. 1 illustrates a flow chart of method steps for supporting a decision making process.

FIG. 1 illustrates a flow chart for minimizing the number of queries to be presented to a decision maker when solving a multi-attribute decision problem with one or more uncertainties. A computing system receives a decision model from a decision maker. A decision model refers to a mathematical model that describes alternatives, attributes and uncertainties associated with the decision problem, including quantitative information necessary to evaluate the alternatives when preference information is provided from the decision maker. The decision model determines a solution for the decision problem based on attributes and uncertainty of the decision problem. In one embodiment, the decision model does not include any preference information of the attributes and the outcome vectors. In one embodiment, the decision model is provided in a form of a probabilistic decision tree or influence diagram.

At steps 110-115 in FIG. 1, the computing system determines, by using Algorithm 1, whether the received decision model can be solved without receiving any preference information from the decision maker. A utility function, which captures the preference information of the decision maker with respect to the attributes of outcomes and with respect to the decision maker's attitude towards risk, is not employed. Algorithm 1 includes steps of: (1) identifying a plurality of strategies integrated into the decision model; (2) evaluating each strategy based on the decision model; and (3) identifying, based on the evaluation, which strategies are preferred over other strategies. Algorithm 1 is further described in detail below.

FIG. 8 illustrates exemplary computing systems that include but are not limited to: a parallel computing system 300 including at least one processor 355 and at least one memory device 370, a mainframe computer 305 including at least one processor 356 and at least one memory device 371, a desktop computer 310 including at least one processor 357 and at least one memory device 372, a workstation 315 including at least one processor 358 and at least one memory device 373, a tablet computer 320 including at least one processor 359 and at least one memory device 374, a netbook computer 325 including at least one processor 360 and at least one memory device 375, a smartphone 330 including at least one processor 361 and at least one memory device 376, a laptop computer 335 including at least one processor 362 and at least one memory device 377 and a server device 340 hosting a cloud computing. The server device 340 includes at least one processor 350 and at least one storage device 345.

Returning to FIG. 1, at step 120, if the received decision model can be solved without any preference information, the computing system evaluates whether the number of preferred strategies ("undominated strategies") becomes manageable so that the number of preferred strategies are small enough (e.g., one or two or three) for a decision maker to choose one strategy or are contrasted enough that the decision maker feels comfortable in choosing one strategy in the set. This evaluation at step 120 can be based on a rule (e.g., the number of preferred strategies shall be less than four) or left to the decision maker to decide by asking one or more questions to the decision maker. Examples of the one or more questions include, but are not limited to: "are you comfortable making a decision?", "would you like to elicit additional preference information to help reduce the set of undominated strategies?"

At steps 135-145, if the received decision model cannot be solved without any preference information, the computing system receives partially specified preference information from the decision maker. In one embodiment, the partially specified preference information is a minimum amount of preference information. For example, the minimum amount of preference information may specify that a user prefers longer life expectancy over a cheaper cost of a treatment option. In order to receive the minimum amount of preference information from the decision maker, the computing system identifies, based on the decision problem, N pairs of outcome vectors to present to the decision maker for preference assessment. The computing system presents N elicitation questions, based on the identified N pairs of outcome vectors, to the decision maker. An elicitation question asks the decision maker which outcome vector the decision maker prefers between two outcome vectors. The decision maker provides answers to the N elicitation questions. The decision maker's answers to the N elicitation questions represent the partially specified preference information.

In order to identify N pairs of outcome vectors, the computing system selects the N pair of outcome vectors that maximizes an expected information gain, e.g., by using programmed method steps of an algorithm "Algorithm 3" described in greater detail herein below. The expected information gain can be measured, for example, as a reduction in an expected number of undominated strategies. The computing system selects the N pair of outcome vectors that balances user-friendliness and the expected information gain. User-friendliness can be modeled based on, including but not limited to: how quickly a user can answer a question, whether a question is qualitative or quantitative, whether an outcome vector is one of existing outcome vectors of the decision problem, whether a user wants to skip answering to a question, etc. At step 145, the computing system elicits decision maker's preference based on the identified N pairs of outcome vectors. The decision maker provides the partially specified preference information by indicating for each pair of outcome vectors presented, which outcome vector(s) (s)he prefers. At step 150, the computing system solves, e.g., by using programmed method steps of an algorithm "Algorithm 2" described in greater detail herein below, the decision model with the received partially specified preference information (i.e., the identified N pairs of outcome vectors).

The computing system repeats steps 115, 120, 135, 145 and 150 until a set of recommended decisions becomes manageable by the decision maker so that the number of the recommended decisions is small enough or so that the recommended decisions are contrasted enough for the decision maker to choose.

By running steps 110, 115, 120, 135, 145 and 150, the computing system facilitates a decision making of a multi-attribute decision problem without implicit extrapolation or inference from preference information provided by a user. Preference information elicited from a user is derived from comparison queries rather than quantitative queries that ask for precise trade-off value. The computing system allows for a "cannot compare" option, i.e., an option that allows the decision maker not to answer one or several of the comparison questions presented. Method steps in FIG. 1 are applicable to a decision problem in any domain(e.g., health care, etc.) with uncertainty as well as a decision problem without uncertainty. In one embodiment, the computing system limits and simplifies an elicitation process (i.e., obtaining preference information from a decision maker) by identifying undominated strategies and/or by avoiding quantitative elicitation questions and/or by asking comparison questions to the decision maker.

In one embodiment, in order to solve a decision problem, the computing system optimizes a number of comparison queries to be asked to a user (i.e., a decision maker, etc.). The computing system elicits, based on the optimized number of comparison queries, a minimal amount of preference information. The computing system solves, based on the elicited minimal amount of preference information, the decision problem within a pre-determined time period. The computing system outputs, as the solution of the decision problem, a set of recommended actions, which includes a list of alternatives that are not dominated, e.g., radiotherapy, active surveillance, etc. A user makes a decision based on the set of recommended actions.

In one embodiment, the decision maker inputs a maximum number of decision strategies, which (s)he can handle to be able to choose a preferred strategy without specifying more information about his preferences with respect to the multiple attributes. The decision maker inputs an upper bound on the predetermined amount of time. The decision maker preferences are elicited in a form of comparison questions, i.e., questions for asking a user of which outcome vectors (s)he prefers between two outcome vectors.

FIG. 2 illustrates a flow chart that describes method steps of Algorithm 3. At step 200, the computing system sets L to be a set of input outcome vectors of the decision problem. At step 205, before starting the processing of steps 210-275, a set called "Cone" that stores N pairs of outcome vectors presented to the decision maker is initialized as empty.

At step 210, the computing system enumerates all pairs (u, v) of outcome vectors in L. The computing system assumes that the decision maker prefers an outcome vector u over an outcome vector v and then sets a score of the pair of outcome vectors (u, v) to be the number of undominated strategies obtained by solving the decision problem under the assumption that the outcome vector u is preferred to the outcome vector v. At step 220, the computing system additionally assumes that the decision maker prefers the outcome vector v over the outcome vector u and then sets a score of the pair of outcome vectors (v, u) to be the number of undominated strategies obtained by solving the decision problem under the additional assumption that the outcome vector v is preferred to outcome vector u. At steps 225-230, the computing system sorts all the pairs of outcome vectors according to an ascending order of their scores. The computing system stores the sorted pairs of outcome vectors in a set called "CandidatePairs."

At step 235-240, for each pair of outcome vector (u, v) in CandidatePairs, if the decision confirms that the outcome vector u is preferred over the outcome vector v, the computing system adds the pair of outcome vector (u, v) to Cone. Preferences represented by the pairs of outcome vectors in Cone are consistent if and only if for every pair (u, v) in Cone, it is not possible to infer that vector v is preferred to vector u. If consistency is violated, the computing system notifies the decision maker, e.g., by sending a text, email, etc., and moves to the next candidate pair (step 235) or generates a new pair (step 260). At step 245, the computing system solves the decision problem with the current Cone. At step 250, if the decision maker evaluates whether a solution from step 245 satisfies the decision maker. If so, the computing system stops processing. Otherwise, the computing system returns to step 255.

At steps 255-260, if the decision maker does not satisfy the solution from step 245, the computing system generates outcome vectors u and v on a boundary of the current Cone, e.g., by generating a linear combination of vectors already in the current Cone. At step 265, if the decision maker confirms that an outcome vector u is preferred to an outcome vector v (or that an outcome vector v is preferred to an outcome vector u), the computing system adds the pair of outcome vector (u, v) (or (v, u)) to Cone. At step 270, the computing system solves the decision problem with the current Cone. At step 250, the decision maker evaluates whether a solution from step 270 satisfies the decision maker. If so, the computing system stops processing. Otherwise, the computing system returns to step 255.

In one exemplary embodiment, a relatively small number of pairs of outcome vectors (e.g., 10-12 pairs of outcome vectors for a decision problem that includes ten attributes) is enough to reduce a set of undominated strategies to a few strategies (in most cases, being a singleton) so that the decision maker can actually choose a decision strategy.

In one embodiment, FIG. 4 illustrates an exemplary pseudo-code 400 for Algorithm 1 called ELIM-MOID. Algorithm 1 is a variable elimination algorithm that computes an optimal policy of a multi-attribute decision problem given in a form of an influence diagram. The Algorithm 1 also computes the set of undominated strategies, denoted by $\max_{\geq}\{EU_A| \text{ policies } \Delta\}$, of the decision problem, where $EU_A$ is an expected utility of a policy or strategy $\Delta$. Given an elimination ordering of variables $\tau = Y_1, \ldots, Y_t$, input probability and utility functions are partitioned, at 410, into a bucket structure, called buckets, such that each bucket is associated with a single variable $Y_l$ and includes all input probability and utility functions whose highest variable in an ordering $\tau$ is $Y_l$. l indicates an index between 1 to t, where t is the number of elements in $\tau$.

Algorithm 1 method 400 performs at 420 processing of each bucket, top-down from the last to the first, invoking a variable elimination procedure that computes new probability (denoted by $\phi$) and utility (denoted by $\psi$) components which are then placed in corresponding lower buckets. For a chance variable $Y_l$ (step 430 of Algorithm 1), the $\phi$-component is generated by multiplying all probability components in a corresponding bucket and eliminating $Y_l$ by summation (at 440 of Algorithm 1). The $\psi$-component is computed as an average utility in that bucket, normalized by the bucket's compiled $\phi$. For a decision variable $Y_l$ (step 450 of Algorithm 1), the computing system computes the $\phi$ and $\psi$ components in a similar manner and eliminates $Y_l$ by maximization. In this case, a product of probability components in the bucket is a constant when viewed as a function of the bucket's decision variable and therefore the compiled $\phi$-component is a constant as well. In FIG. 4, summation, multiplication and maximization operations are assumed to be usual set-based operations. Also, after eliminating the last variable in the ordering $\tau$, the corresponding $\psi$-component is a set of undominated outcome vectors which also corresponds to a set of undominated strategies of the decision problem (i.e., the set $\max_{\geq}\{EU_A|\text{policies } \Delta\}$).

In a bottom-up step, the Algorithm 1 generates an optimal policy (at 460 of Algorithm 1). Buckets are processed in reversed order, from a first variable to a last. For each decision variable, a corresponding decision rule is generated by taking an argument of a maximization operator applied over the combination of probability and utility components in a respective bucket (as indicated at 470), for each combination of values assigned to variables in a bucket's scope while re-calling values assigned to earlier decisions. An optimal strategy, denoted by Δ, is then obtained by taking an union of the decision rules generated at step 460

The following establishes correctness of the variable elimination procedures, for example, Algorithms 1 and 2. Let $\vec{u}, \vec{v} \in R^p$ be two utility vectors each having p number of (≥1) real-valued components such that $\vec{u}=(u_1, \ldots, u_p)$ and $\vec{v}=(v_1, \ldots, v_p)$. These utility vectors may be generated by a utility function that represents preferences of a decision maker. Define a binary relation ≥ on $R^p$ (called Pareto ordering) by $\vec{u} \geq \vec{v} \Leftrightarrow \forall i \in \{1, \ldots, p\}$ $u_i \geq v_i$. For finite sets $U, V \subseteq R^p$, $U \succcurlyeq V$ if some element of U is preferred over every element of V. Define an equivalence relation ≈ between two finite sets U, V in $R^p$ by U≈V if and only if $U \succcurlyeq V$ and $V \succcurlyeq U$. Given a finite set $U \subseteq R^p$, define its convex closure C(U) to include every element of a form $j=1k(q_j \times u^j)$, where k is an arbitrary natural number, $u^j$ in U and each $q_j \geq 0$ and $l=1kq_j=1$. Given finite sets $U, V \subseteq R^p$, define an equivalence relation ≡ by U≡V if and only if C(U)≈C(V). Therefore, two sets of multi-attribute utility vectors are considered equivalent if, for every convex combination of elements of one, there is a convex combination of elements of the other which is at least as good (with respect to the partial order on $\succcurlyeq$ on $R^p$). Assume Scale-Invariance and Independence properties hold (where u, v, w are arbitrary vectors in $R^p$):

[Independence]: If $u \succcurlyeq v$ then $u+w \succcurlyeq v+w$

[Scale-Invariance]: If $u \succcurlyeq v$ and $q \in R$, $q \geq 0$ then $q \times \vec{u} \succcurlyeq q \times \vec{v}$.

The following result also holds. Theorem 1: Let $\succcurlyeq$ be partial order on $R^p$ satisfying Independence and Scale-Invariance. Then, for all q, q1, q2≥0 and for all finite sets $U, V, W \subseteq R^p$, then:

$$q \times (U+V) \equiv q \times U + q \times V; \quad (i)$$

$$(q_1+q_2) \times U \equiv (q_1 \times U) + (q_2 \times U); \quad (ii)$$

$$q_1 \times (q_2 \times U) \equiv (q_1 \times q_2) \times U; \quad (iii)$$

$$\max(q \times U, q \times V) \equiv q \times \max(U,V); \quad (iv)$$

$$\max(U+W, V+W) \equiv \max(U,V)+W. \quad (v)$$

The following describes Algorithm 2 A decision maker may allow some trade-offs between attributes of a multi-attribute decision problem. For example, in a two-attribute situation, the decision maker may want to gain three units of the first attribute at the cost of losing one unit of the second, and hence prefer (3,−1) to (0, 0). Such tradeoffs may be elicited using a structured method, or in a more ad hoc way. Consider some set θ of vector pairs of the form $(\vec{u}, \vec{v})$, where $\vec{u}, \vec{v} \in R^p$. The set θ may include elicited preferences of the decision maker. A binary relation $\succcurlyeq$ on $R^p$ extends set θ if $\vec{u} \succcurlyeq \vec{v}$ for all $(\vec{u}, \vec{v}) \in \theta$. Similarly, $\succcurlyeq$ extends Pareto ordering if $u' \leq v' \rightarrow u' \succcurlyeq v'$.

Consider that the decision maker has a partial order $\succcurlyeq$ over $R^p$, and that the decision maker specifies a set of preferences θ. The input preferences θ (if consistent) give rise to a relation $\succcurlyeq \theta$ which specifies deduced preferences. A vector pair $(\vec{u}, \vec{v})$ can be deduced from θ if $\vec{u} \succcurlyeq \vec{v}$ holds for all partial orders $\succcurlyeq$ that extend θ, extend Pareto, and satisfy Scale-Invariance and Independence. This case is referred as $\vec{u} \succcurlyeq e \vec{v}$. This definition easily implies the following:

PROPOSITION 1: If θ is consistent then $\succcurlyeq \theta$ is a partial order extending θ and Pareto, and satisfying Scale-Invariance and Independence.

Proposition 1 shows that this dominance relation $\succcurlyeq \theta$ a satisfies Scale-Invariance and Independence, giving the properties (Theorem 1) needed by a variable elimination algorithm e.g., Algorithm 2 to be correct. Suppose that a decision maker has an additional preference of (50, 12) over (0, 0), and that hence θ includes a pair ((50, 12), (0, 0)). This may then imply, for example, that (11, 12.78) is dominated with respect to $\succcurlyeq \theta$ by (20, 14.2), i.e., (20, 14.2) is preferred over (11, 12.78). Theorem 2 below gives a characterization of the partial order ≤θ. Let W be some subset of $R^p$. Define C(W) to be a set comprising all vectors $\vec{u}$ such that there exists k≥0 and non-negative real scalars $q_1, \ldots, q_k$ and $\vec{w}_i \in W$ with $$\vec{u} \geq \sum_{i=1}^{k} q_i \vec{w}_i,$$

where ≥ is the weak Pareto relation (and an empty summation is taken to be equal to 0). C(W) is the set of vectors that the decision maker prefers over some (finite) positive linear combination of elements of W.

Theorem 2: Let θ be a consistent set of pairs of vectors in $R^p$. Then $\vec{u} - \vec{v} \in C(\vec{u} - \vec{v}: (\vec{u}, \vec{v}) \in O)$.

Let θ be a finite set of input preferences as $\{(u'_i, v_i i^\tau): i=1, \ldots, k\}$. Theorem 2 shows that, to perform a dominance test (i.e., a preference test) $\vec{u} \succcurlyeq \theta V$, it is sufficient to check if there exist, for $i=1, \ldots, k$, non-negative real scalars $q_i$ such that $u'-v' \geq \Sigma_1(i=1)^{\dagger k=}q_1 i$ $(u_1 i^{\dagger'} - v_1 i^{\dagger'})$.

Alternatively, we can use the fact that the dominance test corresponds to checking whether $\vec{u} - \vec{v}$ is in the set generated by $\{u - \vec{v}: i=1, \ldots, k\}$ plus the p number of unit vectors in $R^p$. Therefore, Algorithm 2 that exploits tradeoffs is obtained from Algorithm 1, by replacing the +0 and max operators with +θ and maxθ, respectively, where maxθ (U, V)=max $\succcurlyeq \theta$ (U ∩ V), U+θ V=max $\succcurlyeq \theta$ (U+V), and max $\succcurlyeq \theta$(U) is a set of undominated (i.e., preferred) elements of finite set $U \subseteq R^p$ with respect to $\succcurlyeq \theta$.

Figure 3:
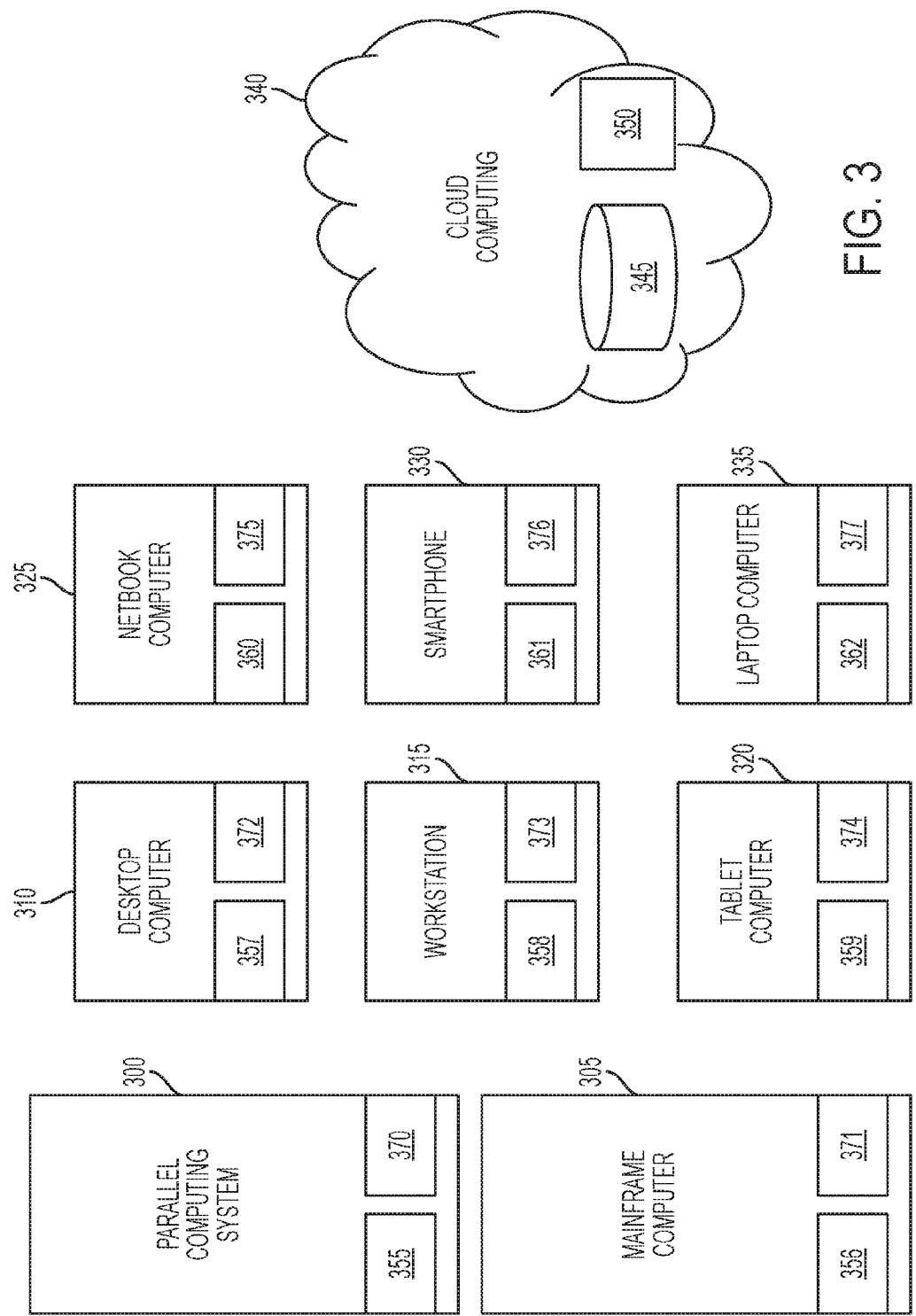
FIG. 3 illustrates exemplary hardware configurations for implementing method steps described in FIGS. 1-2.

One or more of these exemplary computing systems shown in FIG. 3 can run Algorithm 1, Algorithm 2, Algorithm 3, and the method steps shown in FIG. 1.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for supporting a multi-attribute healthcare decision problem requiring a decision among possible treatment options, the method comprising:

receiving, from a user, via an input to a computer system, a user's indication of a maximum number of decision strategies from which the user is able to choose a strategy that solves the healthcare decision problem;

receiving, from the user, via the input to the computer system, a specification of an upper bound pre-determined time period within which a probabilistic decision tree model is run by a processor to solve the healthcare decision problem;

the computer system using a processor for running said probabilistic decision tree model based on the received inputs to minimize a number of comparison queries to be asked to the user, a comparison query requesting which outcome vector the user prefers between two outcome vectors representing possible outcomes of the healthcare decision problem, an outcome vector represented by multiple attributes associated with a treatment option;

using the processor of the computer system to elicit from a decision maker, based on the minimized number of comparison queries, a minimal amount of preference information with respect to the multiple attributes, wherein said eliciting a minimal amount of preference information comprises:

identifying, using the processor, N pairs of outcome vectors to present to the decision maker for preference assessment, said N pairs of outcome vectors identified by:

storing, in a memory unit associated with said processor, a first set of input outcome vectors of the decision problem;

allocating, in said memory unit, a memory structure defining a cone for storing a second set of N pairs of outcome vectors presented to the decision maker, said pairs of outcome vectors enumerated as a set (u, v);

estimating a decision maker preference of an outcome vector for a pair of outcome vectors, wherein if estimated that the decision maker prefers an outcome vector u over an outcome vector v, setting a score of a pair of outcome vectors (u, v) to be a number of undominated strategies obtained by solving the decision problem under an assumption that the outcome vector u is preferred to the outcome vector v; otherwise, if estimated that the decision maker prefers an outcome vector v over an outcome vector u, setting a score of a pair of outcome vectors (v, u) to be a number of undominated strategies obtained by solving the decision problem under an assumption that the outcome vector v is preferred to the outcome vector u;

defining candidate pairs of outcome vectors as an ascending order of all the pairs of outcome vectors according to their corresponding scores;

for each candidate pair of the ordered outcome vector (u, v), confirming whether the decision maker prefers the outcome vector u over the outcome vector v, and in response to said confirming, adding the outcome vector pair (u, v) to the cone;

solving, using the processor, the decision problem with the current outcome vectors (u, v) stored in the cone;

evaluating whether the solution satisfies the decision maker;

if the decision maker does not satisfy the solution, generating outcome vectors u and v on a boundary of the cone by generating a linear combination of vectors already currently in the cone;

if the decision maker confirms that the outcome vector u is preferred over the outcome vector v, adding the pair of outcome vector (u, v) to the cone, otherwise, if an outcome vector v is preferred over the outcome vector u, adding the pair of outcome vector (v, u) to the cone; and repeating the solving of the decision problem with the current cone, the evaluating, the generating, and the adding the pair of outcome vector (u, v) or outcome vector (v, u) to the cone until the solution satisfies the decision maker;

running, by the processor, the decision model to solve, based on the elicited minimal amount of preference information with respect to the multiple attributes, the decision problem within the pre-determined time period;

using a processor of the computer system to output, as the solution of the decision problem, a set of recommended actions;

wherein said decision maker makes a decision based on the set of recommended actions that avoids a full elicitation of preferences over all the multiple attributes.

2. The method according to claim 1, wherein the set of recommended actions are manageable by the decision maker so that the set of recommended actions satisfies a rule or is chosen by the decision maker.

3. The method according to claim 1 wherein prior to eliciting, implementing the decision model for determining a solution to a decision problem based on said multiple attributes and uncertainties of the decision problem, the decision problem including information about a plurality of outcome vectors that represent all possible outcomes and the uncertainties associated with the decision problem, the decision model precluding any preference information of the attributes and the outcome vectors.

4. The method according to claim 3, further comprising: determining whether the decision model can be solved without receiving any preference information from the decision maker.

5. The method according to claim 1, further comprising:
presenting N elicitation questions, based on the identified N pairs of outcome vectors, to the decision maker, an elicitation question requesting of the decision maker which outcome vector the decision maker prefers between two outcome vectors; and providing, by the decision maker, answers to the N elicitation questions as representing the minimal amount of preference information.

6. A computer system for supporting a multi-attribute healthcare decision problem requiring a decision among possible treatment options, the method comprising:
a memory device;
a processor coupled to the memory device, wherein the processor is configured to:
receive, from a user, via an input to a computer system, a user's indication of a maximum number of decision strategies from which the user is able to choose a strategy that solves the healthcare decision problem;
receive from the user, via the input to the computer system, a specification of an upper bound pre-determined amount of time within which a probabilistic decision tree model is run by a processor to solve the healthcare decision problem;
run the probabilistic decision tree model based on the received inputs to minimize a number of comparison queries to be asked to the user, a comparison query requesting which outcome vector the user prefers between two outcome vectors representing possible outcomes of the healthcare decision problem, an outcome vector represented by multiple attributes associated with a treatment option;
elicit from a decision maker, based on the minimized number of comparison queries, a minimal amount of preference information with respect to the multiple attributes, wherein to elicit a minimal amount of preference information, said processor is further configured to:
identify N pairs of outcome vectors to present to the decision maker for preference assessment, said N pairs of outcome vectors identified by:
storing, in the memory device, a first set of input outcome vectors of the decision problem;
allocating, in said memory device, a memory structure defining a cone for storing a second set of N pairs of outcome vectors presented to the decision maker, said pairs of outcome vectors enumerated as a set (u, v);
estimating a decision maker preference of an outcome vector for a pair of outcome vectors, wherein if estimated that the decision maker prefers an outcome vector u over an outcome vector v, setting a score of a pair of outcome vectors (u, v) to be a number of undominated strategies obtained by solving the decision problem under an assumption that the outcome vector u is preferred to the outcome vector v; otherwise, if estimated that the decision maker prefers an outcome vector v over an outcome vector u, setting a score of a pair of outcome vectors (v, u) to be a number of undominated strategies obtained by solving the decision problem under an assumption that the outcome vector v is preferred to the outcome vector u;

defining candidate pairs of outcome vectors as an ascending order of all the pairs of outcome vectors according to their corresponding scores;

for each candidate pair of the ordered outcome vector (u, v), confirming whether the decision maker prefers the outcome vector u over the outcome vector v, and in response to said confirming, adding the outcome vector pair (u, v) to the cone;

solving, using the processor, the decision problem with the current outcome vectors (u, v) stored in the cone;

evaluating whether the solution satisfies the decision maker;

if the decision maker does not satisfy the solution, generating outcome vectors u and v on a boundary of the cone by generating a linear combination of vectors already currently in the cone;

if the decision maker confirms that the outcome vector u is preferred over the outcome vector v, adding the pair of outcome vector (u, v) to the cone, otherwise, if an outcome vector v is preferred over the outcome vector u, adding the pair of outcome vector (v, u) to the cone; and repeating the solving of the decision problem with the current cone, the evaluating, the generating, and the adding the pair of outcome vector (u, v) or outcome vector (v, u) to the cone until the solution satisfies the decision maker;

run the decision model to solve, based on the elicited minimal amount of preference information with respect to the multiple attributes, the decision problem within the pre-determined time period;

output, as the solution of the decision problem, a set of recommended actions;

wherein said decision maker makes a decision based on the set of recommended actions that avoids a full elicitation of preferences over all the multiple attributes.

7. The system according to claim 6, wherein the set of recommended actions are manageable by the decision maker so that the set of recommended actions satisfies a rule or is chosen by the decision maker.

8. The system according to claim 6 wherein prior to eliciting, implementing the decision model for determining a solution to a decision problem based on said multiple attributes and uncertainties of the decision problem, the decision problem including information about a plurality of outcome vectors that represent all possible outcomes and the uncertainties associated with the decision problem, the decision model precluding any preference information of the attributes and the outcome vectors.

9. The system according to claim 8, wherein the processor is further configured to:
determine whether the decision model can be solved without receiving any preference information from the decision maker.

10. The system according to claim 6, wherein the processor is further configured to:
present N elicitation questions, based on the identified N pairs of outcome vectors, to the decision maker, an elicitation question requesting of the decision maker which outcome vector the decision maker prefers between two outcome vectors; and provide, by the decision maker, answers to the N elicitation questions as representing the minimal amount of preference information.

11. A computer program product for supporting a multi-attribute healthcare decision problem requiring a decision among possible treatment options, the computer program product comprising a non-transitory storage medium readable by a processing circuit and storing instructions run by the processing circuit for performing a method, said method steps comprising:

receiving, from a user, via an input to a computer system, a user's indication of a maximum number of decision strategies from which the user is able to choose a strategy that solves the decision problem;

receiving, from a user, via the input to the computer system, a specification of an upper bound pre-determined time period within which a probabilistic decision tree model is run by a processor to solve the decision problem;

the processing circuit for running the probabilistic decision tree model based on the received inputs to minimize a number of comparison queries to be asked to a user, a comparison query requesting which outcome vector the user prefers between two outcome vectors representing possible outcomes of the decision problem, an outcome vector represented by multiple attributes associated with a treatment option;

eliciting from a decision maker, based on the minimized number of comparison queries, a minimal amount of preference information with respect to the multiple attributes, wherein said eliciting a minimal amount of preference information comprises:

identifying N pairs of outcome vectors to present to the decision maker for preference assessment, said N pairs of outcome vectors identified by:

storing, in a memory unit associated with the processing circuit, a first set of input outcome vectors of the decision problem;

allocating, in said memory unit, a memory structure defining a cone for storing a second set of N pairs of outcome vectors presented to the decision maker, said pairs of outcome vectors enumerated as a set (u, v);

estimating a decision maker preference of an outcome vector for a pair of outcome vectors, wherein if estimated that the decision maker prefers an outcome vector u over an outcome vector v, setting a score of a pair of outcome vectors (u, v) to be a number of undominated strategies obtained by solving the decision problem under an assumption that the outcome vector u is preferred to the outcome vector v; otherwise, if estimated that the decision maker prefers an outcome vector v over an outcome vector u, setting a score of a pair of outcome vectors (v, u) to be a number of undominated strategies obtained by solving the decision problem under an assumption that the outcome vector v is preferred to the outcome vector u;

defining candidate pairs of outcome vectors as an ascending order of all the pairs of outcome vectors according to their corresponding scores;

for each candidate pair of the ordered outcome vector (u, v), confirming whether the decision maker prefers the outcome vector u over the outcome vector v, and in response to said confirming, adding the outcome vector pair (u, v) to the cone;

solving, using the processing circuit, the decision problem with the current outcome vectors (u, v) stored in the cone;

evaluating whether the solution satisfies the decision maker;

if the decision maker does not satisfy the solution, generating outcome vectors u and v on a boundary of the cone by generating a linear combination of vectors already currently in the cone;

if the decision maker confirms that the outcome vector u is preferred over the outcome vector v, adding the pair of outcome vector (u, v) to the cone, otherwise, if an outcome vector v is preferred over the outcome vector u, adding the pair of outcome vector (v, u) to the cone; and repeating the solving of the decision problem with the current cone, the evaluating, the generating, and the adding the pair of outcome vector (u, v) or outcome vector (v, u) to the cone until the solution satisfies the decision maker;

solving by running the decision model, based on the elicited minimal amount of preference information with respect to the multiple attributes, the decision problem within the pre-determined time period;

outputting, as the solution of the decision problem, a set of recommended actions;

wherein said decision maker makes a decision based on the set of recommended actions that avoids a full elicitation of preferences over all the multiple attributes.

12. The computer program product according to claim 11, wherein the set of recommended actions are manageable by the decision maker so that the set of recommended actions satisfies a rule or is chosen by the decision maker.

13. The computer program product according to claim 11 wherein prior to eliciting, implementing the decision model for determining a solution to a decision problem based on said multiple attributes and uncertainties of the decision problem, the decision problem including information about a plurality of outcome vectors that represent all possible outcomes and the uncertainties associated with the decision problem, the decision model precluding any preference information of the attributes and the outcome vectors.

14. The computer program product according to claim 13, wherein the instructions configure the processing circuit to:

determine whether the decision model can be solved without receiving any preference information from the decision maker.

15. The computer program product according to claim 11, wherein the instructions further configure the processing circuit to:

present N elicitation questions, based on the identified N pairs of outcome vectors, to the decision maker, an elicitation question requesting of the decision maker which outcome vector the decision maker prefers between two outcome vectors; and provide, by the decision maker, answers to the N elicitation questions as representing the partially specified preference information.

* * * * *